US008020105B1

(12) United States Patent
Lemay et al.

(10) Patent No.: US 8,020,105 B1
(45) Date of Patent: Sep. 13, 2011

(54) UNIFIED USER INTERFACE FOR INSTANT MESSAGING AND EMAIL

(75) Inventors: Stephen Olivier Lemay, San Francisco, CA (US); Greg Christie, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1214 days.

(21) Appl. No.: 10/741,660

(22) Filed: Dec. 19, 2003

(51) Int. Cl.
*G06F 3/00* (2006.01)

(52) U.S. Cl. ........ 715/746; 715/752; 715/748; 715/753; 709/227; 709/230; 709/250

(58) Field of Classification Search .................. 715/745, 715/748, 752, 753; 709/227, 230, 250, 206
See application file for complete search history.

(56) References Cited

U.S. PATENT DOCUMENTS

| | | | |
|---|---|---|---|
| 5,072,412 A | 12/1991 | Henderson, Jr. et al. | |
| 5,617,539 A | 4/1997 | Ludwig et al. | |
| 5,854,893 A | 12/1998 | Ludwig et al. | |
| 5,880,731 A * | 3/1999 | Liles et al. | 715/758 |
| 5,896,500 A | 4/1999 | Ludwig et al. | |
| 6,121,533 A | 9/2000 | Kay | |
| 6,237,025 B1 | 5/2001 | Ludwig et al. | |
| 6,351,762 B1 | 2/2002 | Ludwig et al. | |
| 6,437,818 B1 | 8/2002 | Ludwig et al. | |
| 6,583,806 B2 | 6/2003 | Ludwig et al. | |
| 6,594,688 B2 | 7/2003 | Ludwig et al. | |
| 6,763,226 B1 * | 7/2004 | McZeal, Jr. | 455/90.2 |
| 6,839,737 B1 | 1/2005 | Friskel | |
| 7,152,093 B2 | 12/2006 | Ludwig et al. | |
| 7,164,423 B1 * | 1/2007 | Westen | 345/473 |
| 7,206,809 B2 | 4/2007 | Ludwig | |
| 7,234,117 B2 * | 6/2007 | Zaner et al. | 715/758 |
| 7,421,470 B2 | 9/2008 | Ludwig | |
| 7,433,921 B2 | 10/2008 | Ludwig | |
| 2002/0152877 A1 | 10/2002 | Kay | |
| 2003/0016658 A1 | 1/2003 | Creamer et al. | |
| 2003/0135659 A1 | 7/2003 | Bellotti et al. | |
| 2004/0015610 A1 | 1/2004 | Treadwell | |
| 2004/0039630 A1 | 2/2004 | Begole et al. | |
| 2004/0078448 A1 * | 4/2004 | Malik et al. | 709/206 |
| 2004/0078596 A1 | 4/2004 | Kent et al. | |
| 2004/0128356 A1 | 7/2004 | Bernstein et al. | |

(Continued)

OTHER PUBLICATIONS

Fastmobile.com. Fastmobilie's fastchat Instant Communications Application is Coming to Thousands of Mobile Phone Retail Stores Nationwide. Sep. 2003.*

(Continued)

*Primary Examiner* — Don Wong
*Assistant Examiner* — Tuan-Khanh Phan
(74) *Attorney, Agent, or Firm* — Blakely, Sokoloff, Taylor & Zafman LLP

(57) ABSTRACT

The present invention relates to a unified user interface for instant messaging and electronic mail. In one aspect, a single user interface is provided to allow a user to view email and instant messages. Instant messages and email are received and displayed within a common window within a single application. In one aspect, an instant messaging input field is associated with an email message. For example, in one aspect, when a user associated with an email message is available for instant messaging, an input field appears in a preview pane for the email message. In another aspect of the present invention, instant messages may be managed like an email, e.g. filed, printed, forwarded, stored in folders, etc. For example, in one aspect, a transcript of an instant messaging session may be forwarded as an email.

23 Claims, 8 Drawing Sheets

U.S. PATENT DOCUMENTS

| | | | |
|---|---|---|---|
| 2004/0158610 A1 | | 8/2004 | Davis et al. |
| 2004/0158611 A1* | | 8/2004 | Daniell et al. ............... 709/206 |
| 2004/0172455 A1 | | 9/2004 | Green et al. |
| 2004/0186896 A1 | | 9/2004 | Daniell et al. |
| 2004/0215721 A1* | | 10/2004 | Szeto et al. .................. 709/204 |
| 2004/0254998 A1 | | 12/2004 | Horvitz |
| 2005/0080852 A1* | | 4/2005 | Kelley et al. ................. 709/206 |
| 2005/0080867 A1 | | 4/2005 | Malik et al. |
| 2005/0094621 A1 | | 5/2005 | Acharya et al. |
| 2007/0130259 A1 | | 6/2007 | Daniell et al. |
| 2008/0098078 A1 | | 4/2008 | Daniell |

OTHER PUBLICATIONS

Ljungstrand, Peter. Awareness of Presence, Instant Messaging and WebWho. SIGGROUP Bulletin. Dec. 2000.*

Venolia, Gina D. Understanding Sequence and Reply Relationships Within Email Conversations: A mixed-Model Visualization. ACM Apr. 2003.*

Liam Bannon et al., "Evaluation and Analysis of Users' Activity Organization," CHI '83 Proceedings, Dec. 1983, pp. 54-57.

Peter C. S. Wong et al., Flair-User Interface Dialog Design Tool, Computer Graphics vol. 16, No. 3, Jul. 1982, pp. 87-98.

David R. Cheriton, "Man-Machine Interface Design for Timesharing Systems," University of Waterloo, Ontario, Canada, pp. 362-366.

Michael Good, "Etude and the Folklore of User Interface Design," Laboratory for Computer Science, Massachusetts Institute of Technology, Cambridge, Massachusetts, USA, ACM 1981, pp. 34-43.

D. Austin Henderson, Jr. et al., "Rooms: The Use of Multiple Virtual Workspaces to Reduce Space Contention in a Window-Based Graphical User Interface," ACM Transactions on Graphics, vol. 5, No. 3, Jul. 1986, pp. 211-243.

Stuart K. Card et al., "A Multiple, Virtual-Workspace Interface to Support User Task-Switching," CHI + GI 1987, ACM, pp. 53-59.

Eugene Ball et al., "A Test-Bed for User Interface Designs," Carnegie Mellon University, Pittsburgh, PA , USA, ACM 1981, pp. 85-88.

Warren Teitelman, "Ten Years of Window Systems—A Retrospective View," Methodology of Window Management, Proceedings of an Alvey Workshop at Cosener's House, Abingdon, UK, Apr. 1985. 13 pages.

Eve M. Schooler et al., "Multimedia Conferencing: Has it Come of Age?", Reprinted from the Proceedings 24$^{th}$ Hawaii International Conference on System Sciences, vol. 3, pp. 707-716 (Jan. 1991) pp. 1-10.

Eve M. Schooler, "A Distributed Architecture for Multimedia Conference Control," ISI Research Report, Nov. 1991, University of Southern California Information Sciences Institute, Title page, + pp. 1-18.

Eve M. Schooler, "The Connection Control Protocol: Architecture Overview," Version 1.0, USC/Information Sciences Institute, Jan. 1992, pp. 1-6.

Joseph D. Touch, "Zoned Analog Personal Teleconferencing (ZAPT)," USC/ Information Sciences Institute, pp. 1-19.

Eve M. Schooler, "Case Study: Multimedia Conference Control in a Packet-switched Teleconferencing System," USC/Information Sciences Institute, pp. 1-17.

Terrence Crowley, et al., "MMConf: An Infrastructure for Building Shared Multimedia Applications," CSCW '90 Proceedings, Oct. 1990, pp. 329-342.

Harry Forsdick, "Explorations into Real-time Multimedia Conferencing," Computer Message Systems- 85, IFIP, 1986, pp. 331-347.

Robert W. Root, "Design of a Multi-Media Vehicle for Social Browsing," Bell Communications Research, Morristown, NJ, USA, ACM 1988, pp. 25-38.

S. R. Ahuja et al., "A Comparison of Application Sharing Mechanisms in Real-Time Desktop Conferencing Systems," AT&T Bell Laboratories, Holmdel, NJ, USA, ACM 1990, pp. 238-248.

Hiroshi Ishii, "TeamWorkStation: Towards a Seamless Shared Workspace," NTT Human Interface Laboratories, Japan, CSCW '90 Proceedings, Oct. 1990, pp. 13-26.

Thomas Kaeppner et al., Architecture of HeiPhone: A Testbed for Audio/Video Teleconferencing, IBM European Networking Center, Heidelberg, pp. 1-17.

Kankanahalli Srinivas et al., "MONET: A Multi-media System for Conferencing and Application Sharing in Distributed Systems," CERC Technical Report Series Research Note, Feb. 1992, 10 pages (2-sided).

Gordano Messaging Suite Data Sheet, Gordano Limited 1994-2003, pp. 1-6, North Somerset UK.

* cited by examiner

UNIFIED USER INTERFACE FOR INSTANT MESSAGING AND EMAIL

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2003, Apple Computer, Inc., All Rights Reserved.

TECHNICAL FIELD

This disclosure relates generally to user interfaces for processing (e.g., generating, storing, displaying or otherwise presenting, transmitting and/or receiving, etc.) electronic communication, and in particular, relates to a unified user interface for instant messaging and electronic mail.

BACKGROUND OF THE INVENTION

Instant messaging is the real-time exchange of messages between two or more users. Instant messaging typically occurs between users which are logged onto an instant messaging service at the same time. Also known as a "chatting," instant messaging has become very popular for both business and personal use. Instant messaging (IM) provides a way to contact users immediately, providing that they are available for chatting. Users are typically signaled when other instant messaging users have logged on, indicating that at least for the moment, the other user is available for chatting. Thus, instant messaging is often used as a way to avoid the back and forth of electronic mail (email) communications. Unlike instant messaging, email is not real-time, and there can be delays of several minutes. Email and instant messaging are typically handled by separate applications. Furthermore, instant messaging sessions are typically ephemeral and are not routinely archived, as is email. Thus, the differences between email and instant messaging makes it difficult for users to efficiently organize and manage their messaging records.

SUMMARY OF THE DESCRIPTION

The present invention relates to a unified user interface for instant messaging and electronic mail. In one exemplary aspect, a single user interface is provided to allow a user to view email and instant messages. Instant messages and email are received and displayed within a common window within a single application. In one aspect, an instant messaging input field is associated with an email message. For example, in one aspect, when a user associated with an email message is available for instant messaging, an input field appears in a preview pane for the email message. In another aspect of the present invention, instant messages may be managed like an email, e.g. filed, printed, forwarded, stored in folders, etc. For example, in one aspect, a transcript of an instant messaging session may be forwarded as an email.

In another aspect, an email message is displayed in a first graphical user interface window. It is then detected whether a user associated with the email message is available for a messaging session. If the user associated with the email message is available for messaging, messaging session controls are displayed in the first window. The messaging session controls are to send messaging session content to the user or to receive messaging session content from the user.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1A:
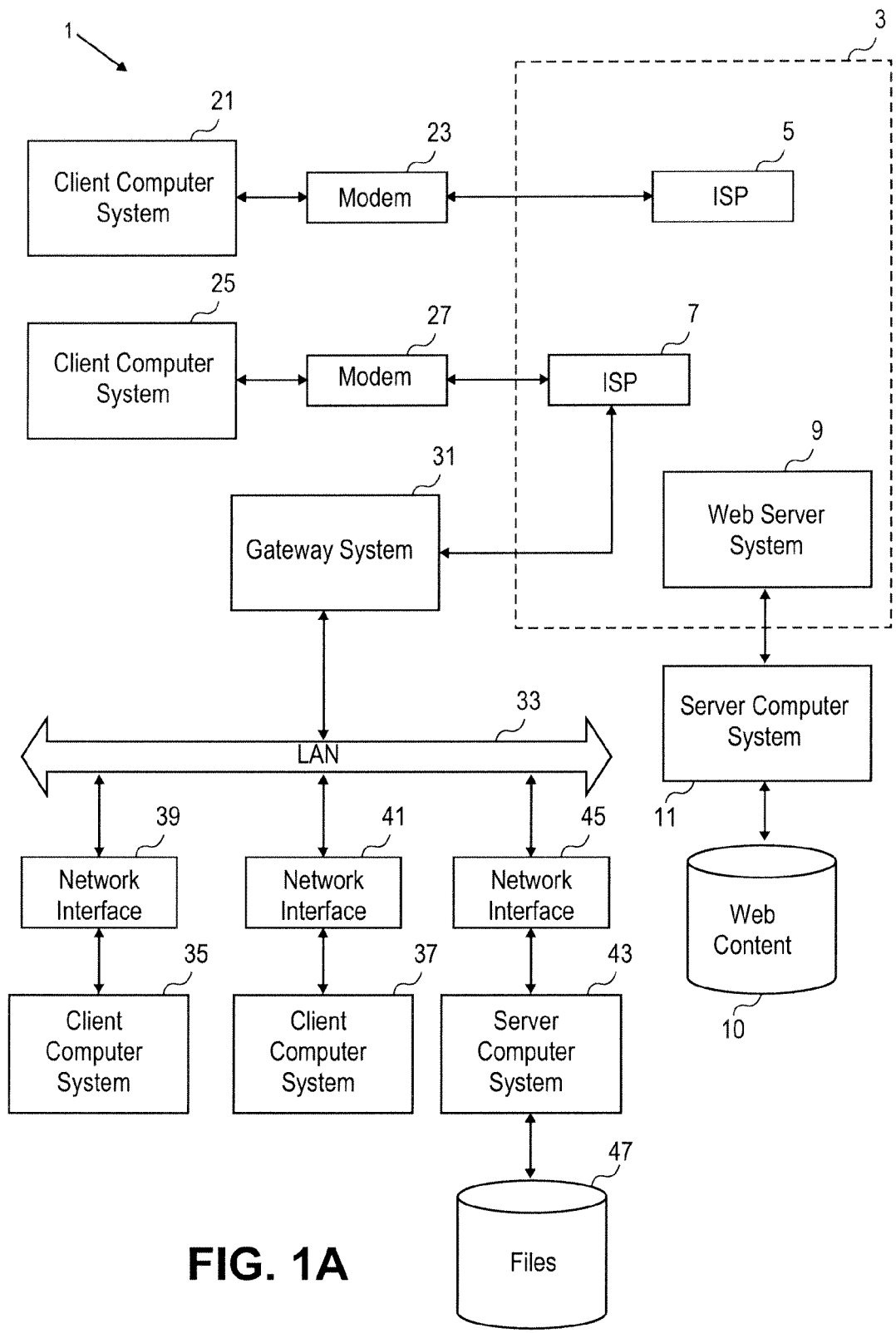
FIG. 1A illustrates an embodiment of an operating environment suitable for practicing the present invention.
Figure 1B:
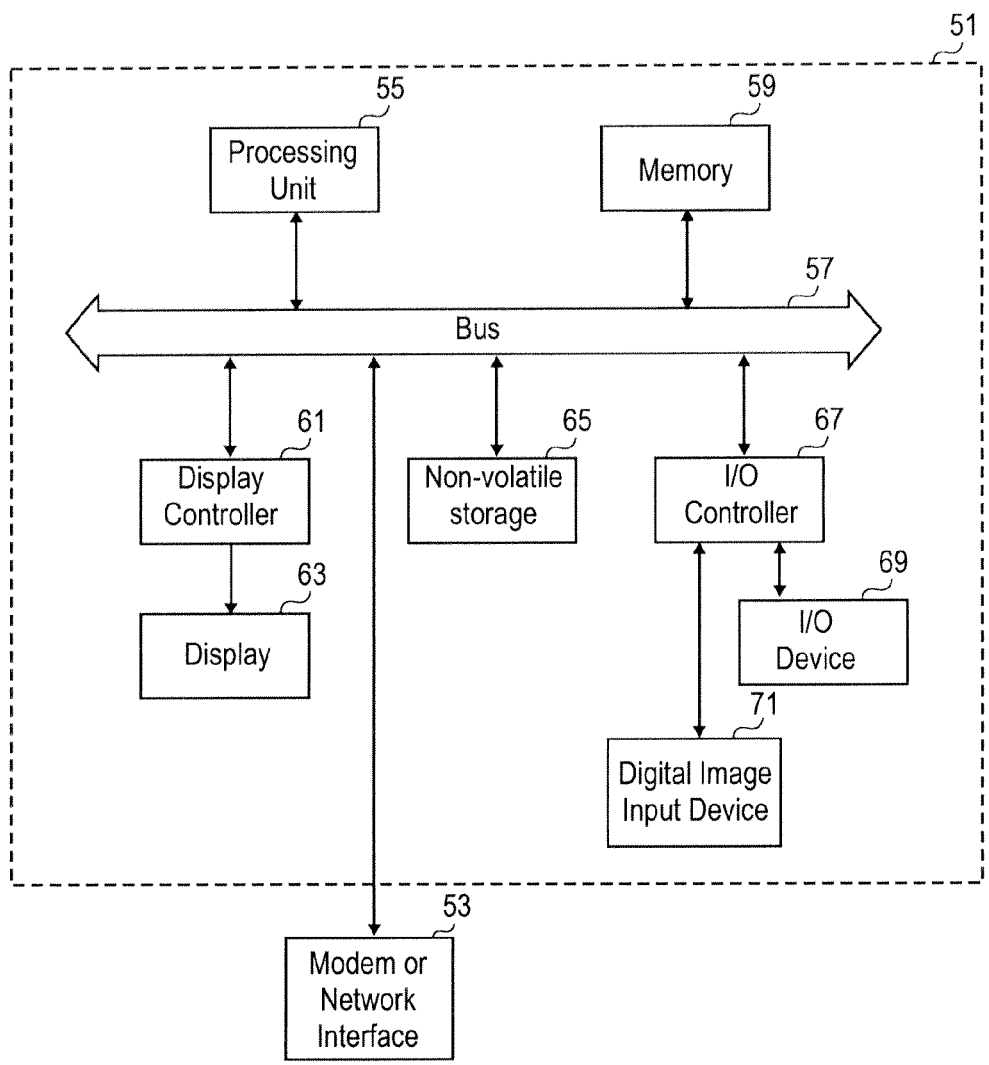
FIG. 1B illustrates an embodiment of a computer system suitable for use in the operating environment of FIG. 1A.

The following description of FIGS. 1A and 1B is intended to provide an overview of computer hardware and other operating components suitable for implementing embodiments of the invention described below, but is not intended to limit the applicable environments. One of skill in the art will immediately appreciate that the invention can be practiced with other computer system configurations, including hand-held devices, cellular telephones, multiprocessor systems, microprocessor-based or programmable consumer electronics/appliances, network PCs, minicomputers, mainframe computers, and the like. Embodiments of the invention can also be practiced in distributed computing environments where tasks are performed by remote processing devices that are linked through a communications network.

FIG. 1A shows several computer systems 1 that are coupled together through a network 3, such as the Internet.

The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send emails and instant messages, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 1A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, consumer electronics/appliance, a network computer, a Web TV system, a handheld device, or other such computer system. Similarly, the ISP 7 provides Internet connectivity for client systems 25, 35, and 37, although as shown in FIG. 1A, the connections are not the same for these three computer systems. Client computer system 25 is coupled through a modem interface 27 while client computer systems 35 and 37 are part of a LAN. While FIG. 1A shows the interfaces 23 and 27 as generically as a "modem," it will be appreciated that each of these interfaces can be an analog modem, ISDN modem, DSL modem, cable modem, satellite transmission interface, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 1B shows one example of a conventional computer system that can be used as a client computer system or a server computer system or as a web server system. The computer system of FIG. 1B may, for example, be an Apple Macintosh computer. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, DSL modem, cable modem, token ring interface, satellite transmission interface, or other interfaces for coupling a computer system to other computer systems. The computer system 51 includes a processing unit 55, which can be a conventional microprocessor such as a G3 or G4 microprocessor from Motorola, Inc. or IBM, a Motorola Power PC microprocessor, or an Intel Pentium microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display (LCD). The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the terms "computer-readable medium" and "machine-readable medium" include any type of storage device that is accessible by the processor 55 and also encompass a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 1B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Mac® OS operating system from Apple Computer, Inc. of Cupertino, Calif., and their associated file management systems. The file management system is typically stored in the non-volatile storage 65 and causes the processor 55 to execute the various acts required by the operating system to input and output data and to store data in memory, including storing files on the non-volatile storage 65.

Figure 2A:
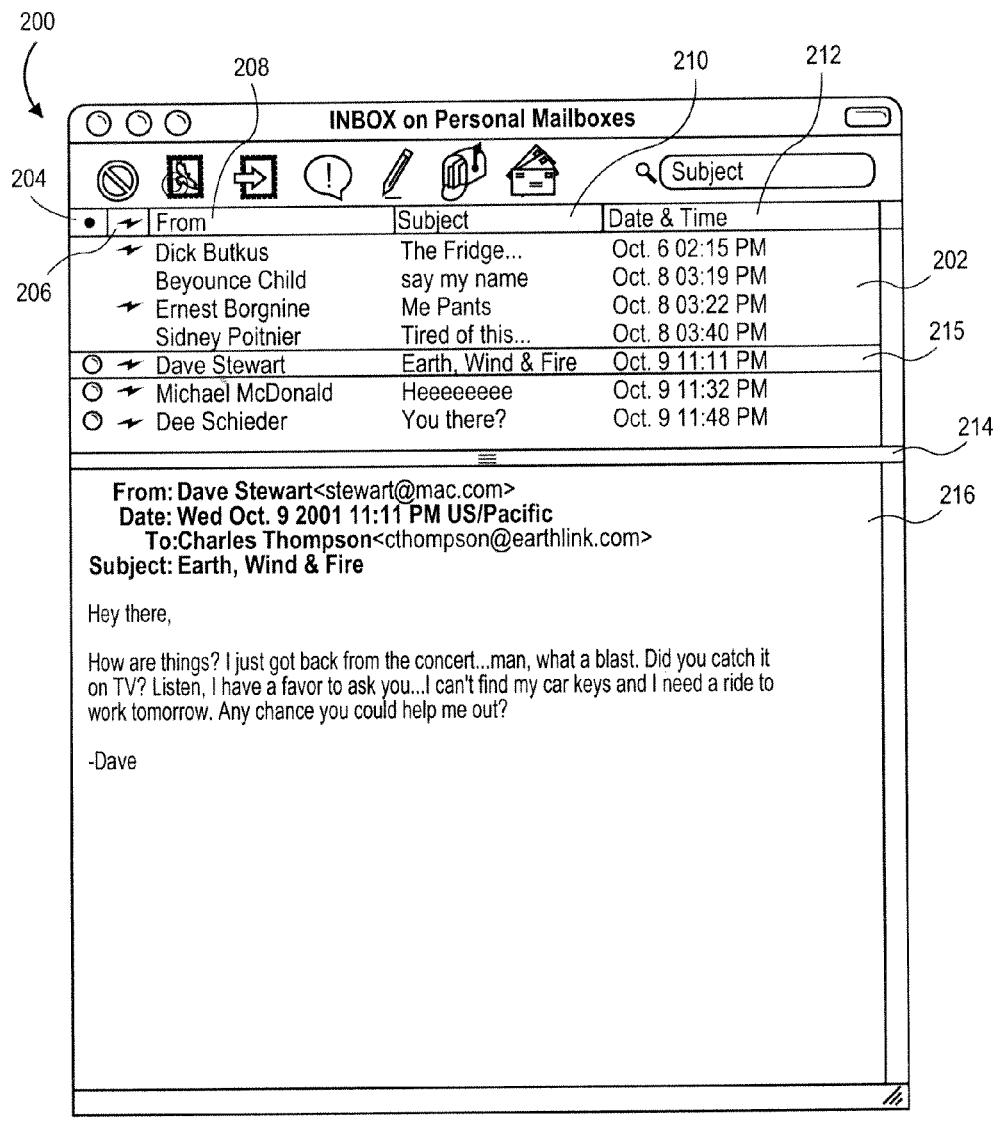
FIG. 2A illustrates an embodiment of a unified graphical user interface for instant messaging and email.
Figure 2B:
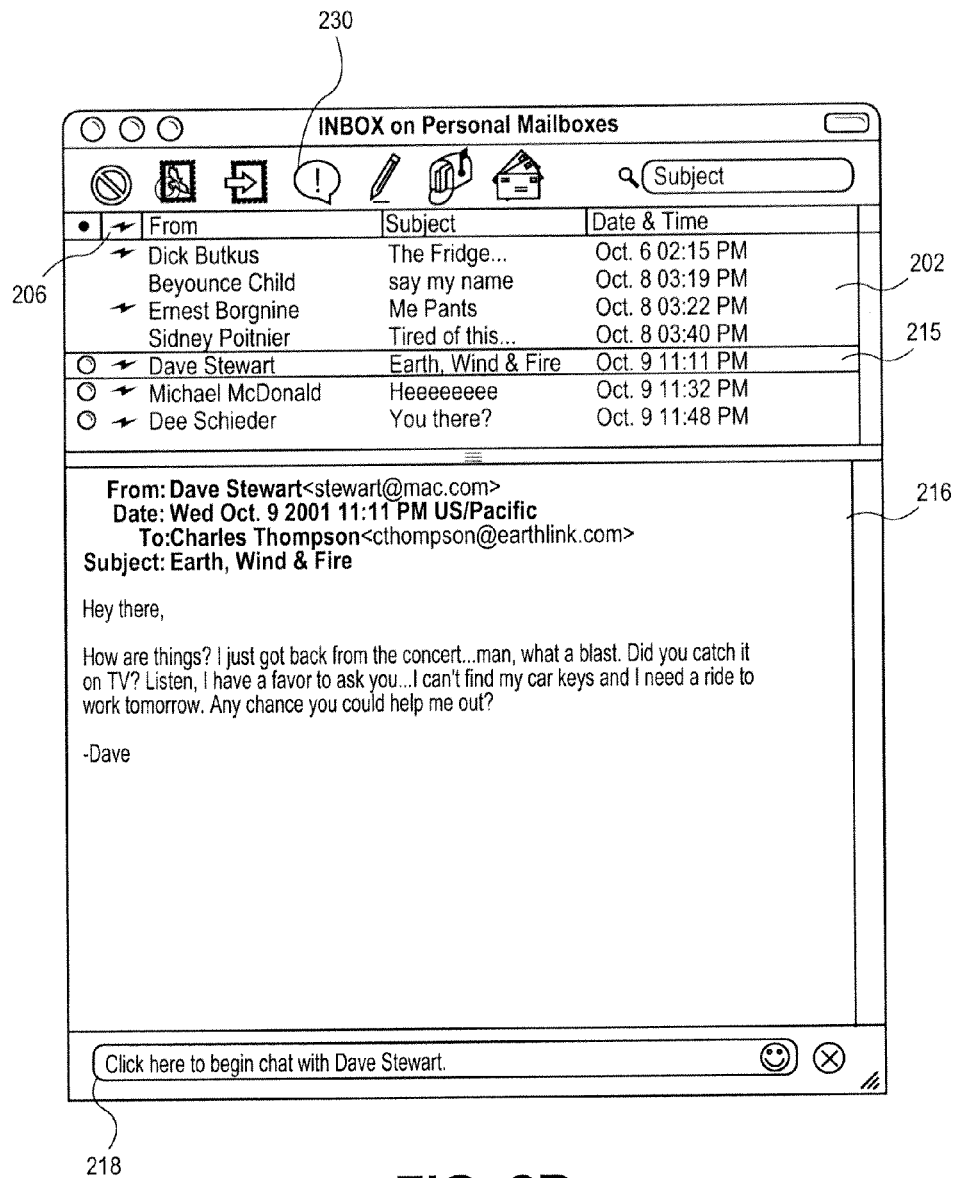
FIG. 2B illustrates an embodiment of a unified graphical user interface for instant messaging and email including an input field.
Figure 2C:
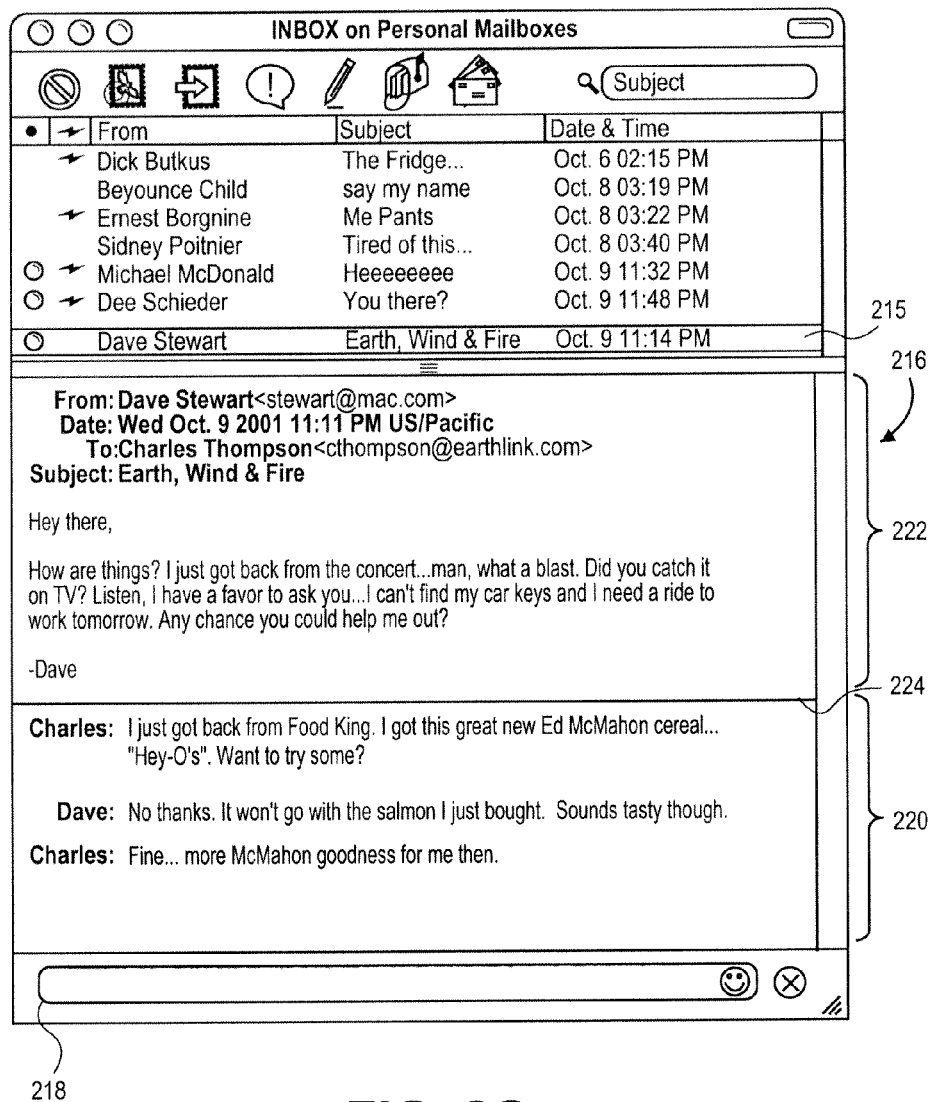
FIG. 2C illustrates an embodiment of a unified graphical user interface for instant messaging and email including instant messaging content.

Embodiments of the present invention are described with respect to FIGS. 2A-2C. FIG. 2A illustrates an embodiment of a unified graphical user interface (GUI) for instant messaging and email. As illustrated, the unified GUI, which is typically displayed as a window 200 on a display of a computer or other digital processing system, includes a number of display and control functions for processing messaging records. Messaging records refers to records which contain electronic mail (email), instant messaging sessions, or records which include both email and instant messaging content. In one embodiment, messaging records may also contain other types of media data, such as images, video or audio data. The window 200 includes a plurality of panes, which separate the window 200 into portions. A table of contents (TOC) pane 202 lists messaging records. For example, in the embodiment illustrated in FIG. 2A, the TOC 202 lists received messaging records. In one embodiment, email messages or instant messaging sessions appear as records or items in the TOC 202.

The TOC 202 includes columns which contain information for each record. Column 204 indicates the status of a record. For example, in one embodiment, the color of the indicator in column 204 reflects whether the corresponding record has content which has not yet been viewed. Column 208 displays the name of the user from which the record originated. Column 210 displays the subject of the corresponding record, and column 212 displays the date and time of the record. According to one aspect of the invention, column 206 includes a visual indicator to indicate whether the user from which the record originated is available for instant messaging. For example, in one embodiment, column 206 displays an icon of a lightning bolt to indicate that the user from which the corresponding record originated is online, and is accepting instant messaging requests. In other embodiments, other icons, such as for example an ellipsis (e.g. three dots) may be displayed in column 206 to indicate the same. It will be recognized that this feature may be implemented as a general availability indicator in an application to indicate messaging records for which an immediate dialogue (e.g. email, instant messaging, video chat, audio chat, etc.) may be available with a user associated with the record.

In one embodiment, the date and time of a record is updated as new content is added to the record, as described below. Messaging records listed in the TOC 202 may be sorted based on the information displayed in any of columns 204, 206, 208, 210 and 212. A splitter 214 separates the TOC 202 from the preview pane 216. Preview pane 216 displays the content of a record 215 which is selected in the TOC 202. As illustrated in FIG. 2A, the record 215 from Dave Stewart is currently selected, and hence the email message content of the record is displayed in preview pane 216.

FIG. 2B illustrates an embodiment of the GUI as illustrated in FIG. 2A, with the addition of an messaging input object. In one embodiment, the messaging input object is an input field 218. Input field 218 allows a user to initiate an instant messaging session with another user associated with the record which is currently selected in the TOC 202, for example, the sender of an email. In one embodiment, input field 218 appears in pane 216 when a user associated with a selected record is available for an instant messaging session. For example, in the embodiment illustrated in FIG. 2B, when the email record from Dave Stewart is selected in the TOC 202, the email message content will appear in the preview pane 216. Additionally, since the user associated with the email message, in this case Dave Stewart, is available for an instant messaging session, as indicated by the icon in column 206, the input field 218 will appear. This provides a user with a way to conveniently initiate an instant messaging session with another user associated with the selected record in the TOC 202. In one embodiment, if the user associated with the selected record in the TOC 202 is offline or is otherwise not currently available for instant messaging, then input field 218 does not appear in pane 216.

In one embodiment, an input object includes functionality to receive input, such as text entered from a keyboard, or handwriting entered through the use of a pen or stylus. In other embodiments, input object may include functionality for receiving other input, such as video or audio.

Input field 218 may be displayed in various ways. In one embodiment, input field 218 appears simultaneously with the messaging record content in preview pane 216 when the record is selected in the TOC 202, if the user associated with the record is available for instant messaging. In another exemplary embodiment, if a user associated with a record becomes available for instant messaging while the message is currently being browsed, input field 218 appears by animating up (e.g. popping up) from the lower portion of pane 216. In yet another embodiment, input field 218 includes an affordance, i.e. a visual clue to the function of the input field 218. For example, in the embodiment illustrated in FIG. 2B, when input field 218 appears, a clue stating "Click here to begin chat . . . " appears to assist the user. In another embodiment, a button becomes active (clickable) or changes appearance to denote the availability of an associated user for a messaging session, such as an instant messaging session.

In another embodiment, input field 218 may appear when a user receives an invitation to join an instant messaging session from another user. For example, if an invitation to instant message is accepted, input 218 may appear in pane 216. Pane 216 may also display content from a messaging record associated with the instant messaging session. For example, a transcript of a previous instant messaging session may be displayed in pane 216, and the transcript is updated as the instant messaging session is resumed.

In another embodiment, if a user associated with a selected record in the TOC is available for instant messaging, a new window including an input field appears. In yet another exemplary embodiment, where a window 200 includes a TOC list of messaging records without a preview pane, as a user selects various messaging records within the TOC, an input field will appear within the window for those selected records for which an associated user is available for instant messaging. In one embodiment, if a user initiates a chat by typing a message in the input field, a pane appears to display the instant messaging content. In another embodiment, a separate window appears to display the instant messaging content when an instant messaging session is initiated.

FIG. 2C illustrates an embodiment of the GUI of FIG. 2B including instant messaging content 220. In one embodiment, where a user initiates an instant messaging session by typing in the input field 218, the content of the ensuing instant messaging session is displayed in pane 216. As replies are input and received in the instant messaging session, the instant messaging content 220 or transcript is updated in pane 216. In one embodiment, the email content 222 is separated from the instant messaging content 220 by a divider 224. In another embodiment, instant messaging content 220 appears in a separate pane from the pane 216 displaying the email content 222.

In one embodiment, the instant messaging content 220 is combined with the email content 222 to create a combined messaging record including both email and instant messaging content. In other words, the instant messaging session is integrated with the email message into a new messaging record. In one embodiment, the record may be updated with any new instant messaging content. In another embodiment, a user may optionally select how instant messaging content is handled. For example, a user may control whether it is appended to an existing record (e.g. an email record), whether it is stored as a separate record. Additionally, in one embodiment, a user may control whether the instant messaging content is retained or discarded. In one embodiment, instant messaging content is automatically archived.

In one embodiment, as each new reply is input or received for the instant messaging session, the date and time information for the messaging record is updated to reflect the date and time of the most recently added content to the messaging record. For example, in one embodiment, where the TOC 202 is sorted in ascending order based on date and time column 212, as illustrated in FIG. 2C, if on October 10, new instant messaging content were added to the record from Dave Stewart received October 9, the record would move to the bottom of the list, as it would contain the most recent new content. Additionally, a new record in TOC 202 is not necessarily created for each instant messaging session. For example, if an instant messaging session is associated with a previous email, or is a continuation of an earlier instant messaging session, the new content is incorporated into the associated record. If an instant messaging session is new, i.e. not associated with a previous messaging record or not a reply to a previous message, then it appears as a new item or entry in the TOC 202. In one embodiment, a messaging record is associated with a message ID, which is used to identify subsequent related messaging content.

Figure 2D:
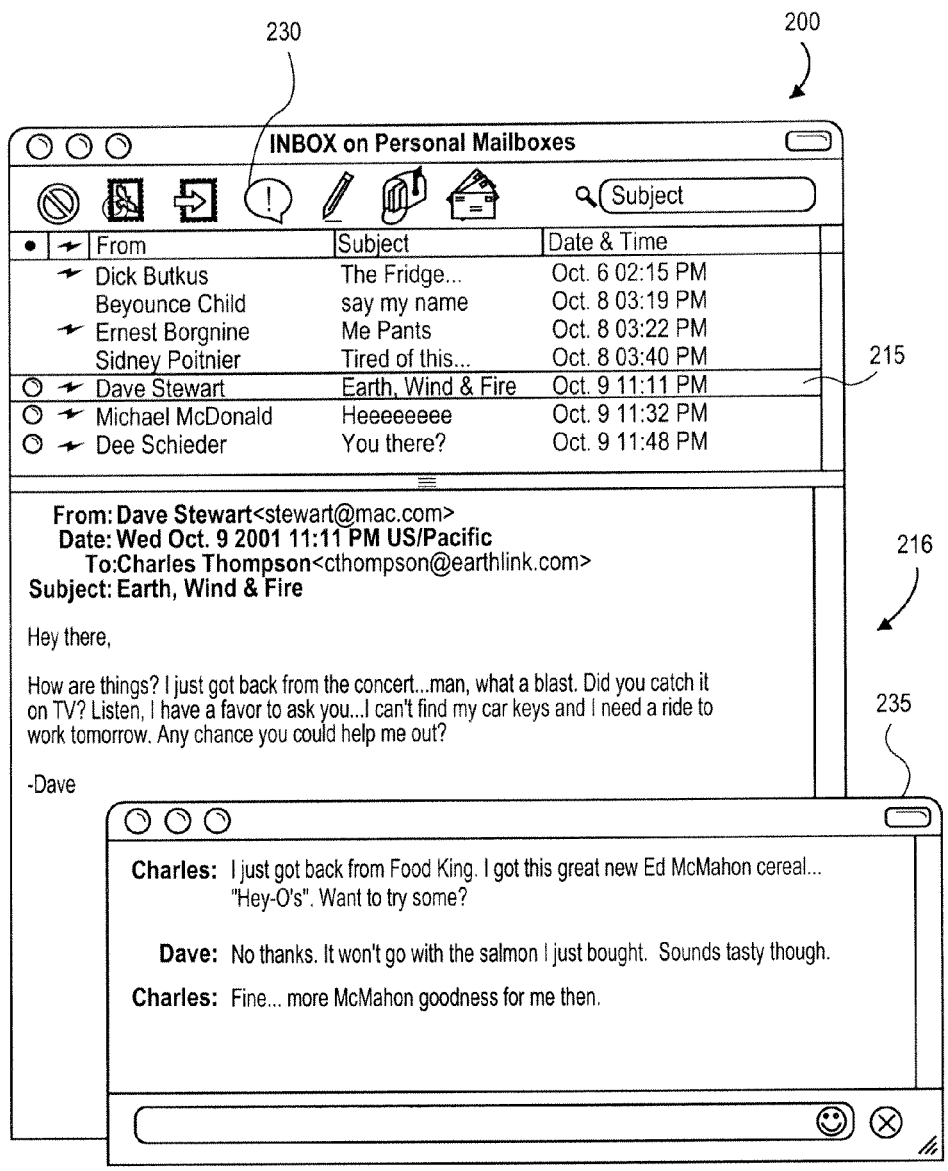
FIG. 2D illustrates an embodiment of a unified graphical user interface for instant messaging and email including instant messaging content in a separate window.

A chatting session may also be implemented in other ways. For example, in one embodiment, a user may initiate an instant messaging session which is displayed in pane 216 by clicking on a button. In another embodiment, an instant messaging session is launched in a separate window. For example, in one embodiment, when a user associated with a selected record 215 is available for instant messaging, a button 230, illustrated in FIG. 2B, may be clicked or selected to launch an instant messaging session. In one embodiment, clicking on button 230 spawns an instant messaging session with a user associated with a selected record 215 in a separate window 235, as illustrated in FIG. 2D. In another embodiment, a user may toggle between messaging record content in preview pane 216 and an instant messaging session associated with the messaging record by clicking on a tab button. In one embodiment, when a user clicks the tab, messaging record content in preview pane 216 is replaced by instant messaging content associated with the messaging record. In another embodiment, a user may click a button to display a drawer including instant messaging content. The drawer is a child window that slides out from a parent window (window 200) that the user can open or close (show or hide) while the parent window 200 is open.

In one embodiment, the software application which controls window 200 also controls the separate windows launched from window 200, such as window 235. In one exemplary embodiment, where an instant messaging session is in a separate window 235 from the main application window 200, as illustrated in FIG. 2D, the separate window 235 is controlled by the software application that controls the main application window 200. For example, in one embodiment, closing the main application window 200 will also cause the separate window 235 to close. In another embodiment, terminating the software application which controls window 200 will also cause the instant messaging session in window 235 to terminate.

The integration of email and instant messaging in a unified GUI provides numerous advantages. For example, in one embodiment, a user may initiate an instant messaging session relating to the subject of an email, without having to explain to the receiving party what the instant message is in regards to, since the recipient of the invitation receives the invitation in association with a previous email. In one embodiment, instant messaging sessions are automatically archived and organized in a similar manner as email. This allows a user to review previous instant messaging sessions, in addition to permitting instant messaging threads which span long time periods. For example, conventional instant messaging sessions end when a user terminates the instant messaging application. In one embodiment of the present invention, instant messaging sessions are stored and may be resumed whenever both parties are available for chatting. This allows a user to continue a chat over multiple sessions, while preserving the content of previous chat sessions. This also facilitates recollection of what was discussed in previous chat sessions.

In one embodiment, a messaging record which includes instant messaging content (e.g. an instant messaging session or a message record with email and instant messaging content) may be handled as conventional email messages are. For example, a messaging record including email and instant messaging content may be forwarded as an email message to other users. In one embodiment, the instant messaging content may be converted to a text transcript. In another embodiment, HTML (HyperText Markup Language) may be used to present the instant messaging content within the forwarded email message.

In one embodiment, an option is provided to strip the message record of instant messaging content. This may be used, for example, where instant messaging content was added to an email message, and a user desires to forward only the original email message to another user. Alternatively, in one embodiment, where a messaging record includes email and instant messaging content, the email message may be stripped from the record, so that a user may forward only the transcript of the instant messaging session to another user. In yet another embodiment, the stripping function may be applied to extract either email messages or instant messaging content from records containing both, for the purpose of conserving storage space.

Although FIGS. 2A-2C are illustrates embodiments using an Inbox, it will be appreciated that embodiments of the present invention may be applied to other folders, such as for example a Sent folder, or other user generated folders.

Figure 3:
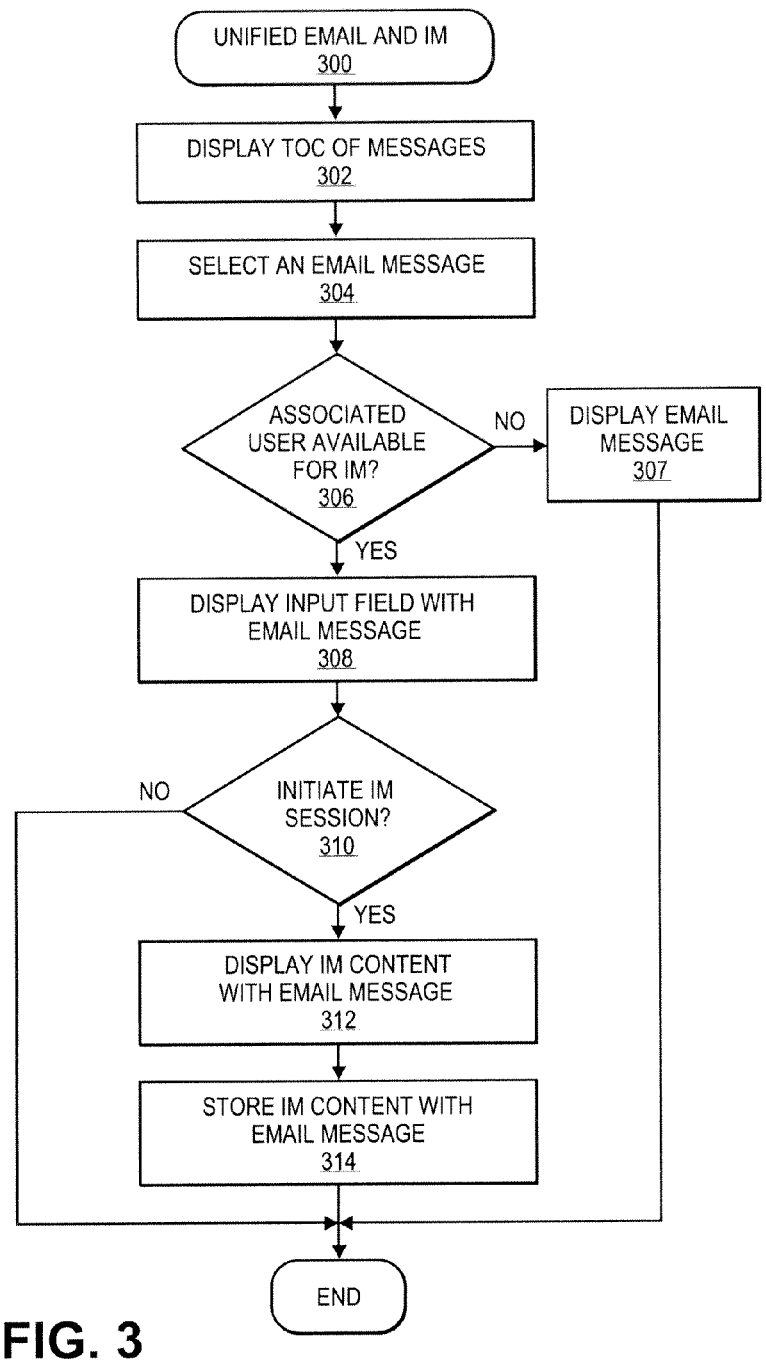
FIG. 3 illustrates an embodiment of a method 300 for unified email and instant messaging content.

FIG. 3 illustrates an embodiment of a method 300 for unified email and instant messaging content. A list or table of contents (TOC) of messaging records is displayed by the method 300 (Block 302). For example, in one embodiment, the list is the TOC 202 illustrated in FIGS. 2A-2C. In addition to email messages, the TOC may also include instant messaging sessions, and messaging records including both email and instant messaging content. A user selects an email message from the TOC (Block 304). For example, the user may use a cursor control device, such as a mouse, to select or click an item in the TOC.

The method 300 determines whether a user associated with the selected message is available for instant messaging (Block 306). A user associated with a selected message is a user who was a party to the initial email. For example, the "From:" field of a selected email message in an Inbox identifies a user associated with the message, i.e. the sender. A user is available for instant messaging if they are online, and are accepting instant messaging invitations. If a user associated with a selected email message is not available for instant messaging, the selected email message is displayed in a preview pane (Block 307). If a user associated with a selected message is available for instant messaging, the selected email message is displayed in a preview pane with an input field for initiating an instant messaging session with the associated user (Block 308).

In one embodiment, a user may initiate an instant messaging session by inputting text into the input field (Block 310). If a chat is initiated, the instant messaging content is displayed with the email message in the preview pane (Block 312). In one embodiment, as instant messaging replies are sent and received by the user, the messaging content is updated in the preview pane. The instant messaging content is stored along with the email message as a single messaging record (Block 314).

Figure 4:
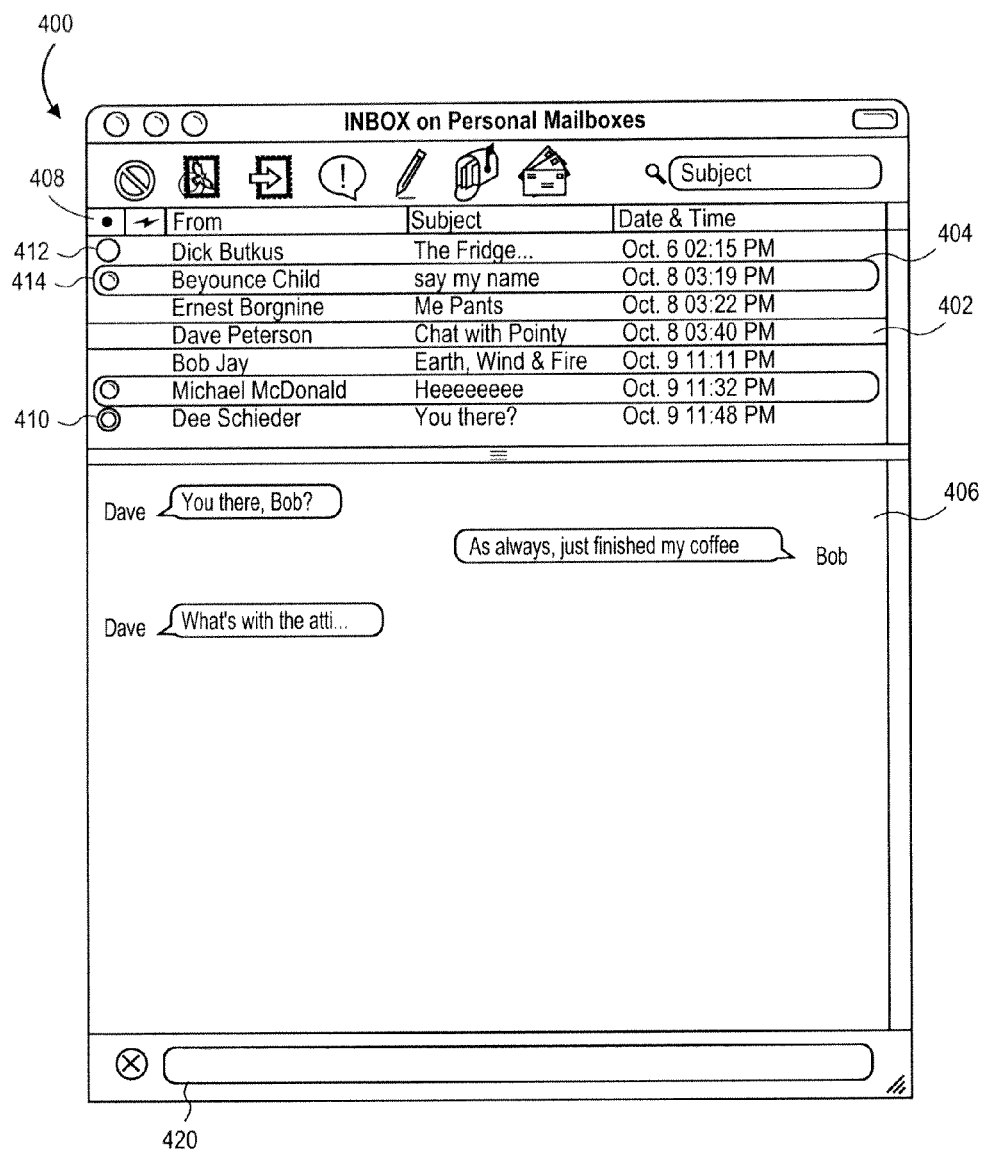
FIG. 4 illustrates an embodiment of a unified graphical user interface for instant messaging and email.

FIG. 4 illustrates another embodiment of a unified GUI of the present invention displayed in a window 400. A table of contents (TOC) pane 404 lists messaging records which may include email messages, instant messaging sessions, or combinations thereof. The content of a currently selected instant messaging record 402 is displayed in preview pane 406. In the exemplary embodiment illustrated in FIG. 4, an Inbox TOC 404 serves as a centralized location for viewing received email and instant messaging content. This provides several advantages to users which facilitate organization and management of their messaging records. The technique of dragging an item and dropping it on a suitable destination is called drag and drop. For example, in one embodiment, a user may drag a messaging record, such as an email, from the TOC 404 and drop it into the preview pane 406 for a currently selected instant messaging session 402. In one embodiment, dropping an email message pastes the text of the email message into the selected instant messaging session 402. In another embodiment, dropping the email on an instant messaging record causes the email to be sent to the associated user through a file transfer protocol. Similarly, in another embodiment, an instant messaging record may be dragged and dropped into an new email message, or an instant messaging session, to insert a transcript of the instant messaging session.

In one embodiment, a user may sort their messaging records into folders. In addition to email messages, instant messaging records may also be sorted into folders like email. This allows a user to drag and drop instant messaging records from the TOC 404 into appropriate folders for organization. An advantage is that a user may store all related messaging records (email and instant messages) conveniently in a single folder.

As discussed above, in one embodiment, since instant messaging sessions are archived, new content may be added to an instant messaging sessions which has been idle for a sustained period, e.g. over several user sessions. In one embodiment, new instant messaging sessions (i.e. those that are not in reply to a previous messaging record) are typically sorted in a user's inbox folder. However, when a user sorts an instant messaging session record into a folder, the user has several options for handling subsequent replies to the instant messaging session (i.e. how the messaging record is updated). In one embodiment, once placed in a folder, the messaging record remains in the folder, with a visual indicator to indicate that new content is present. In another embodiment, a reply to an instant messaging session which has been placed in a folder causes the messaging thread to be split. The new reply shows up as a new record in the user's inbox, and the previous thread remains in its assigned folder. In yet another embodiment, a new reply to the thread causes the messaging record to be pulled from the folder and placed into the user's inbox. In still yet another embodiment, a reply to the thread causes the messaging record to appear in both the inbox and its original folder.

In one embodiment, pane 406 includes an input field 420, similar to the input field 218 of FIGS. 2B and 2C, when a user associated with instant messaging content in a selected messaging record 402 is available online for instant messaging. For example, in one embodiment, a user may be browsing an archived instant messaging session 402, and if a user associated with the instant messaging session (in this case, Dave Peterson), is available for instant messaging, the input field 420 is present in pane 406 to allow the user to resume the instant messaging session. In one embodiment, input field 420 allows a user to input replies for an instant messaging session, and the content of the instant messaging session is updated in pane 406 as the session progresses.

In one embodiment, a method similar to method 300 described above with respect to FIG. 3, may be applied to govern the presence of input field 420 for messaging records including instant messaging content. For example, in one embodiment, a user selects an instant messaging record from the TOC 404. The instant messaging content is displayed in pane 406. If a user associated with the instant messaging content (e.g. another user involved in the chat) is available for instant messaging, input field 420 is displayed in pane 406. If a user then initiates or resumes the instant messaging session by inputting text into the input field 420, the content of the session is updated in pane 406, as well as in the messaging record.

Various visual indicators may be used in the TOC 404 to distinguish various types of messaging records and their status. In one embodiment, various colored dots in column 408 of the TOC 404, indicate the status of messaging record, such as whether the messaging record includes new content which has not yet been viewed. For example, in one embodiment, a red dot 410 indicates that a messaging record includes unviewed content. In one embodiment, visual indicators may be used in the TOC 404 to differentiate instant messaging records from records including only email content. For example, in one embodiment, a bubble 412 in column 408 indicates that the record includes an instant messaging session which has ended or is otherwise idle. In another embodiment, a bubble 414 surrounding around an entire item in the TOC 404 indicates an instant messaging session which is currently in progress or active. In yet another embodiment, a bubble 416 surrounding a dot in column 408 indicates an unviewed or unanswered instant messaging invitation. It will be appreciated that the visual indicators described above are only exemplary, and various other indicators may be used with embodiments of the present invention.

In another embodiment of the present invention, a user may disable or "turn off" the instant messaging capabilities of the GUI and the associated application. The disabling may be temporary or permanent. For example, a button or setting in a preferences menu may be used to control this feature. In a software application embodying the present invention, this feature may be useful to users who prefer to use only the email aspects of the application. Likewise, in another exemplary embodiment, a user may disable or "turn off" the email capabilities of the GUI and the associated application, such that a software application embodying the present invention may be used primarily for managing instant messaging records.

It will be appreciated that embodiments of the present invention may be used with other forms of messaging other than instant messaging or email. For example, in one embodiment, the user interface may incorporate functionality for receiving, sending, and managing other text-based messaging, such as Short Message Service (SMS) messages. SMS is a text message service that enables short messages of generally up to 140-160 characters in length to be sent and transmitted, typically from a mobile phone or other portable communication device.

In another exemplary embodiment, the user interface may incorporate functionality for receiving, sending and managing other types of messaging, such as video chats, video conferencing, or audio communications. For example, in one embodiment, where it is detected that a sender of an email message is available for a video chat or otherwise receiving real time video content from the user, controls for sending or initiating the video chat will appear in the same window of user interface in which the email messaging record appears. In one embodiment, such controls may include, for example, on, off, play, pause, fast forward, and rewind, among others. Similarly, in another embodiment, when it is detected that a sender of a messaging record is available for receiving audio communications, controls for initiating an audio Communication session will be displayed in the user interface.

Further information concerning the processing of electronic messages (e.g. electronic mail and instant messaging) for use with embodiments of the present invention can be found in a co-pending U.S. patent application Ser. No. 10/741,948, entitled "Method And Apparatus For Processing Electronic Messages", filed Dec. 19, 2003, for which the inventor is Jens Alfke, and which is assigned to a common assignee of the present application. The above-identified U.S. Patent Application is hereby incorporated by reference.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method performed by a processor implemented on a semiconductor chip within a computing system, comprising:

rendering an email inbox in a first section of a graphical user interface;

detecting that a first user has selected an email message listed within the email inbox;

rendering the selected email message as an email message in a second section of the graphical user interface, the rendered selected email message showing the text of the email message;

detecting whether a second user that wrote the email message is available for instant messaging; and in response to the second user that wrote the email message being deemed available for instant messaging from the detecting and without the first user affirmatively confirming that the first user intends to respond to the email, rendering on said graphical user interface an indication that the second user is available for instant messaging, and, changing the state of an instant messaging start feature from not visible on said graphical user interface to visible on said graphical user interface, the instant messaging start feature to allow the first user to choose to send instant messaging content and not email content to the second user from a computer system that is performing the method;

in response to a detected selection of the instant messaging start feature, rendering a third section of the graphical user interface in which content of an instant message to be sent to the second user is to be typed by the first user;

causing said instant message to be sent to said second user;

receiving a response instant message from said second user; and, rendering in a fourth section of said graphical user interface an instant messaging conversation between the first and second users, the instant messaging conversation containing the instant message sent by the first user to the second user and the instant message sent by the second user to the first user.

2. The method of claim 1, further comprising:

combining the instant messaging conversation and the email message to create a combined messaging record; and storing the combined messaging record.

3. The method of claim 2, further comprising:

extracting the instant messaging conversation from the combined record; and sending a transcript of the instant messaging content as an email message.

4. The method of claim 3, further comprising:

extracting the email message from the combined record; and sending the email message.

5. A machine readable storage medium containing program code that when processed by a processor implemented on a semiconductor chip causes a computing system to perform a method, the processor being part of the computing system, the method comprising:

displaying an email message as an email message in a first graphical user interface window;

detecting whether a second user that wrote the email message is available for instant messaging; and performing the following in response to the second user that wrote the email message being deemed available for instant messaging from the detecting and without a first user of the computing system affirmatively confirming that the first user intends to respond to the email message:

displaying, in the first window, an indication that the second user is available for instant messaging; and, displaying, in the first window, an instant messaging input object, the instant messaging input object to allow a first user to choose to send instant messaging content and not email content to the second user from the computing system having the processing unit that is performing the method;

in response to a detected selection of the input object, displaying a second window in which content of an instant message to be sent to the second user appears, said second window and content being displayed while said email's content is displayed within said first window; and, in response to an indication to send said instant message, sending said instant message to said second user.

6. The machine readable storage medium of claim 5, wherein the method further comprises:
   receiving instant messaging content from the second user; and
   displaying the received instant messaging content in the first window with the email message and the sent instant messaging content.

7. The machine readable storage medium of claim 6, wherein the method further comprises:
   combining the instant messaging content and the email message to create a combined messaging record; and
   storing the combined messaging record.

8. The machine readable storage medium of claim 7, wherein the method further comprises:
   extracting the instant messaging content from the combined record; and
   sending a transcript of the instant messaging content as an email message.

9. The machine readable storage medium of claim 8, wherein the method further comprises:
   extracting the email message from the combined record; and
   sending the email message.

10. A computer system comprising a storage medium and a processor implemented on a semiconductor chip, the storage medium containing program code that when processed by the processor causes the computing system to perform a method, comprising:
    displaying an email message as an email message in a first graphical user interface window;
    detecting whether a second user that wrote the email message is available for instant messaging and without a first user of the computing system affirmatively confirming that the first user intends to respond to the email message; and
    performing the following response to it being deemed, from the detecting, that the second user that wrote the email message is available for instant messaging:
       displaying, in the first window, an indication that the second user is available for instant messaging; and,
       displaying, in the first window, an instant messaging input object, the instant messaging input object to allow the first user to choose to send instant messaging content and not email content to the second user from the computer system;
    in response to a detected selection of the input object, displaying a second window in which content of an instant message to be sent to the second user appears, said second window and content being displayed while said email's content is displayed within said first window; and,
    in response to an indication to send said instant message, sending said instant message to said second user.

11. The computer system of claim 10, wherein the method further comprises:
    receiving instant messaging content from the second user; and
    displaying the received instant messaging content in the first window with the email message and the sent instant messaging content.

12. The computer system of claim 11, wherein the method further comprises:
    combining the instant messaging content and the email message to create a combined messaging record; and
    storing the combined messaging record.

13. The computer system claim 12, wherein the method further comprises:
    extracting the instant messaging content from the combined record; and
    sending a transcript of the instant messaging content as an email message.

14. The computer system of claim 13, wherein the method further comprises:
    extracting the email message from the combined record; and
    sending the email message.

15. A method performed by a computer system, comprising:
    displaying an email message as an email message in a first graphical user interface window;
    detecting whether a second user that wrote the email message is available for instant messaging and without a first user of the computer system affirmatively confirming that the first user intends to reply to the email message; and
    performing the following in response to it being deemed, from the detecting, that the second user that wrote the email message is available for instant messaging:
       displaying, in the first window, an indication that the second user is available for instant messaging; and,
       displaying, in the first window, an instant messaging input object, the instant messaging input object to allow a first user to choose to send instant messaging content and not email content to the second user from the computer system;
    in response to a detected selection of the input object, displaying a second window in which content of an instant message to be sent to the second user appears, said second window and content being displayed while said email's content is displayed within said first window; and,
    in response to an indication to send said instant message, sending said instant message to said second user.

16. The method of claim 15, wherein the method further comprises:
    receiving instant messaging content from the second user; and
    displaying the received instant messaging content in the first window with the email message and the sent instant messaging content.

17. The method of claim 16, wherein the method further comprises:
    combining the instant messaging content and the email message to create a combined messaging record; and
    storing the combined messaging record.

18. The method of claim 17, wherein the method further comprises:
    extracting the instant messaging content from the combined record; and
    sending a transcript of the instant messaging content as an email message.

19. The method of claim 18, wherein the method further comprises:
    extracting the email message from the combined record; and
    sending the email message.

20. A computer system comprising a storage medium and a processor implemented on a semiconductor chip, the storage medium containing program code that when processed by the processor causes the computer system to perform a method, comprising:

rendering an email inbox in a first section of a graphical user interface;

detecting that a first user has selected an email message listed within the email inbox;

rendering the selected email message as an email message in a second section of the graphical user interface, the rendered selected email message showing the text of the email message;

detecting whether a second user that wrote the email message is available for instant messaging; and in response to the second user that wrote the email message being deemed available for instant messaging from the detecting and without the first user affirmatively confirming that the first user intends to reply to the email message, rendering on said graphical user interface an indication that the second user is available for instant messaging, and, changing the state of an instant messaging start feature from not visible on said graphical user interface to visible on said graphical user interface, the instant messaging start feature to allow the first user to choose to send instant messaging content and not email content to the second user from the computer system;

in response to a detected selection of the instant messaging start feature, rendering a third section of the graphical user interface in which content of an instant message to be sent to the second user is to be typed by the first user;

causing said instant message to be sent to said second user;

receiving a response instant message from said second user; and, rendering in a fourth section of said graphical user interface an instant messaging conversation between the first and second users, the instant messaging conversation containing the instant message sent by the first user to the second user and the instant message sent by the second user to the first user.

21. The computer system of claim 20, further comprising:

combining the instant messaging conversation and the email message to create a combined messaging record; and storing the combined messaging record.

22. The computer system of claim 21, further comprising:

extracting the instant messaging conversation from the combined record; and sending a transcript of the instant messaging conversation as an email message.

23. The computer system of claim 22, further comprising:

extracting the email message from the combined record; and sending the email message.

* * * * *